April 4, 1950 — R. V. MEYER — 2,503,165
PHOTOMETRIC APPARATUS FOR QUANTITATIVE SPECTROANALYSIS
Filed April 17, 1945
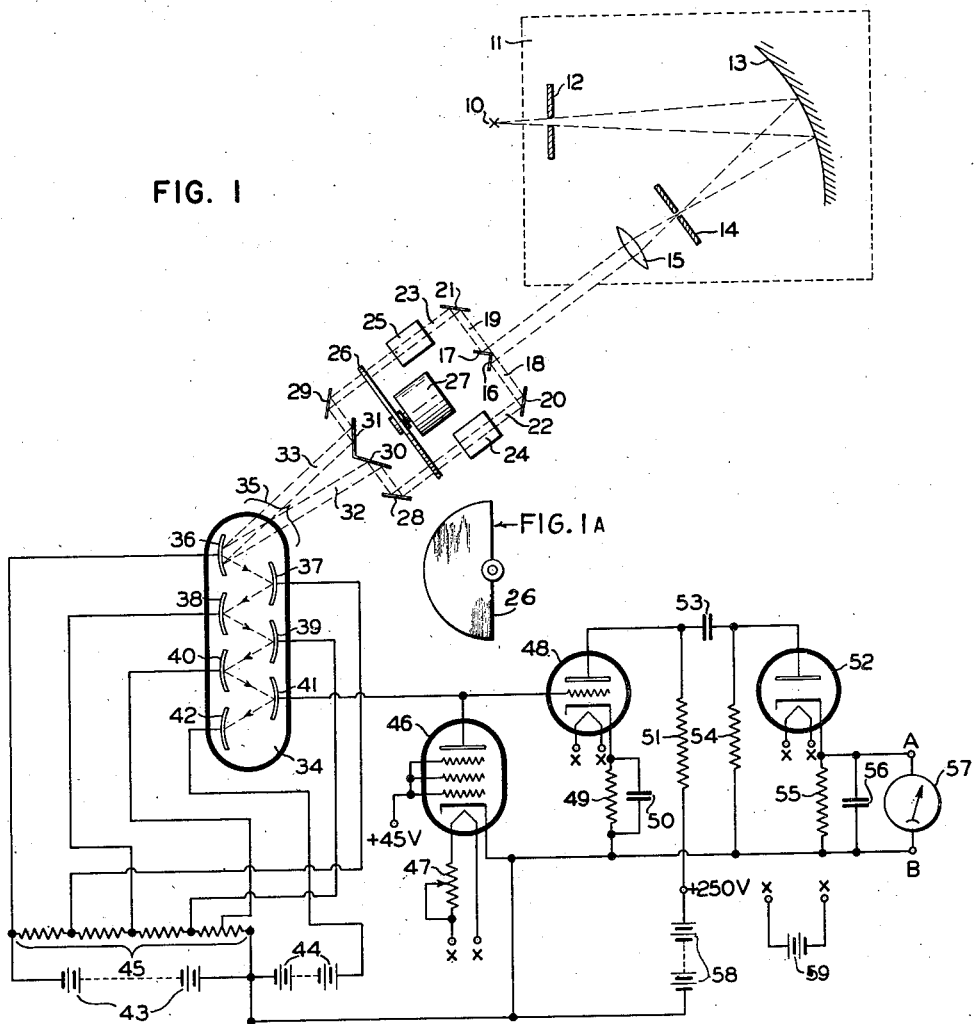
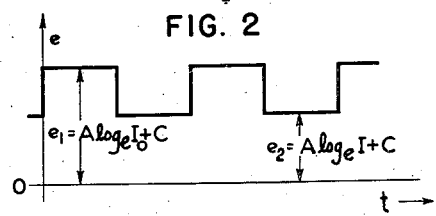
FIG. 2
$e_1 = A\log_e I_o + C$  $e_2 = A\log_e I + C$
FIG. 3
$e_3 = A\log_e \dfrac{I}{I_o}$
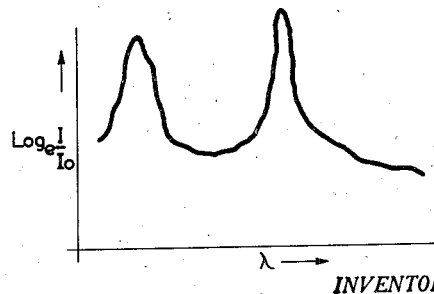
FIG. 4
$\log_e \dfrac{I}{I_o}$
INVENTOR.
BY Robert V. Meyer Patented Apr. 4, 1950

2,503,165

UNITED STATES PATENT OFFICE 2,503,165

PHOTOMETRIC APPARATUS FOR QUANTITATIVE SPECTROANALYSIS

Robert Vance Meyer, Arlington, Mass.

Application April 17, 1945, Serial No. 588,737

8 Claims. (Cl. 250—207)

This invention relates to photometric apparatus, and particularly to apparatus useful in absorption and emission analysis.

The purpose of absorption and emission analysis is to determine the presence or the concentration of one or more substances in any physical matter in the form of a solid, liquid, or gas, by observing and measuring the emissivity or radiation absorbing qualities characteristic of the substance and substances. It is a well-known fact that emissivity or radiation absorption are characteristics of substances.

In absorption analysis radiation of substantially a single and variable wavelength is produced by means of a radiation source and a monochromator, and caused to be incident upon and transmitted through the matter to be investigated, which contains the substance. The law found by Beer and Lambert states the following relation between the concentration of the substance in the matter and the intensities of the incident and transmitted radiations:

$$I/I_o = e^{dkc}$$

where $I_o$ = intensity of incident radiation
$I$ = intensity of transmitted radiation
$k$ = a coefficient depending upon the absorbing substance and the wavelength of the incident radiation
$d$ = the length of the path of the radiation through the matter
$e$ = the base of natural logarithms
$c$ = concentration of the substance in the matter.

The concentration $c$ is determined by $$c = 1/kd \times \log_e I/I_o$$

which means that the concentration of the substance is proportional to the logarithm of the ratio of intensities of the incident and transmitted radiation.

The product $kc$ is determined for known concentrations and $k$ computed. The length $d$ can readily be measured. Therefore, a measurement of $\log_e I/I_o$ is a direct indication of the concentration $c$.

In some cases it is of interest merely to detect the presence of a substance or substances in matter by determining the radiation absorption characteristic curve of the substance. In these cases the factor $k$ is plotted against $$\frac{1}{cd} \times \log_e I/I_o$$

and a curve derived in this manner is termed the characteristic absorption curve.

In emission analysis, the matter under investigation is excited to radiation, for example by placing it in an electric arc. The analysis is based upon the intensity of one of the spectral lines, or, in other words the radiation of substantially a single wavelength, emitted by the substance in the matter under investigation, the presence or concentration of which is to be determined. The intensity of this radiation is dependent upon the energy exciting the atoms to emission, and the number of atoms of the substance present, or the concentration of the substance.

A spectral line of the radiation of another substance already present in the matter and of an intensity substantially independent of its concentration, or a spectral line of the radiation of another substance deliberately added to the matter in known concentration, is chosen for the purpose of a comparison measurement. The intensities of radiation of these spectral lines do not vary with the concentration of the substance to be investigated, but are subject to the same variations as the intensity of the spectral line of the substance under investigation due to other causes, principally variations due to changes in the excitation energy.

The relation $c = I_x/I_c$ is obtained, where $c$ = the concentration of the substance
$I_x$ = the intensity of a spectral line emitted by the substance under investigation
$I_c$ = the intensity of radiation of another spectral line, which varies only with the excitation.

This relation can also be written as $$\log_e c = \log_e I_x/I_c$$

This modified relation is used to advantage in the present invention, as will be pointed out later.

In the past, various methods and types of apparatus have been used to determine indirectly or directly the presence and concentration of a substance in matter under investigation.

One of the methods in general use in emission analysis is the photographic method, in which the emitted spectrum is photographed, the photographic plate or film developed, and the density of the photographic image measured. This method is subject to errors due to non-linearity of the density versus incident radiation intensity characteristic of the photographic emulsion, and due to non-uniformity of the photographic emulsion, its development, and its spectral response, as well as non-uniformity of the transmissitivity of the emulsion carrier, which may be of glass or cellulose film.

Furthermore, the photographic process is tedious, time consuming, and requires highly skilled personnel.

Various null methods are also in use for absorption analysis, in which the intensity of the incident radiation is reduced by suitable apparatus to equal the intensity of the transmitted radiation. This apparatus usually comprises a Nicol prism, limited in its use substantially to the visible portion of the spectrum, or a suitable diaphragm or density wedge.

The use of a diaphragm is objectionable since it requires perfect uniformity of intensity over the cross section of the radiation beam, portions of which are intercepted by the diaphragm for the purpose of intensity control.

The use of density wedges has the disadvantage that a given wedge is usable only over a limited portion of the spectrum, so that frequent interchange of wedges is necessary for complete coverage of the spectrum.

The accuracy of measurement by such apparatus obviously depends upon the accuracy of construction and calibration of these parts. Consequently, instruments of this type having a reasonable degree of accuracy are very costly and delicate.

Still other methods used in absorption analysis do not employ the measurement of the ratio of two radiation intensities, but assume that the incident radiation intensity remains constant. Measurements made by these methods are limited in accuracy by the degree to which the intensity of the incident radiation can be held constant.

Some methods for measuring incident and transmitted radiation intensities in absorption analysis use two separate radiation responsive means, individually exposed to incident and transmitted radiation, respectively. Such methods are limited in accuracy by the degree of dissimilarity of the two radiation responsive means. It has been found extremely difficult in practice to find two reasonably similar radiation responsive devices by tedious and most careful selection and to maintain a reasonable degree of similarity in operation.

The object of the present invention, therefore, is to provide new and improved photometric apparatus, in which the disadvantages of conventional methods and apparatus are overcome.

Another object of the invention is to provide apparatus adapted for direct indication of the presence of a substance in matter and the concentration thereof.

Still another object is to provide apparatus for direct indication of the logarithm of the ratio of two radiation intensities.

A further object is to provide apparatus which uses a single radiation responsive device, and, therefore, does not depend upon similarity of two radiation responsive devices.

Another object is to provide apparatus adapted to give a continuous and direct indication of concentration of a substance as the spectrum is scanned.

In accordance with the present invention, there is provided photometric apparatus comprising means for producing radiation of an intensity independent of a characteristic of a substance, means for producing radiation of an intensity dependent upon said characteristic of said substance, a single radiation responsive means adapted to be exposed to said first and said second radiation, means cooperating with said radiation responsive means for producing a voltage of a magnitude logarithmically proportional to the intensities of said radiations, means for deriving from said voltage a second voltage of a magnitude proportional to the logarithm of the ratio of said radiation intensities, and means for utilizing said second voltage.

For a better understanding of the invention, together with other and further objects thereof, reference is had to the following description, taken in connection with the accompanying drawings, and its scope will be pointed out in the appended claims.

In the accompanying drawing Fig. 1 is a schematic representation of photometric apparatus for absorption analysis embodying the present invention, Fig. 1A shows a plan view of the shutter sector used in the apparatus, while Figs. 2 and 3 are graphs representing operating characteristics of the apparatus, to aid the understanding of the invention, and Fig. 4 is a sample of an absorption curve obtainable with the present apparatus.

Referring now more particularly to Fig. 1 of the drawings, there is shown schematically photometric apparatus embodying the present invention in a preferred form. In general, the apparatus includes a radiation source schematically indicated at 10, such as a hydrogen lamp, incandescent lamp, or glow bar, depending upon the range of radiation wavelengths desired. What is termed a glow bar is a bonded silicon carbide rod about $5/16$ inch in diameter and several inches long. The ends fit into metallic cup electrodes. An electrical potential of 100 volts applied across the rod brings it to an orange or yellow heat. Such rods are commercially available under the trade name "Globar."

A monochromator, generally indicated at 11, is provided for selecting from the radiation emitted from the source 10, radiation of substantially a single wavelength. Such monochromators are known in the art, and generally comprise a narrow entrance slit 12 for selecting a portion of the radiation from the source 10 with a cross section of the shape of a narrow line.

A reflection grating 13 is provided in the path of the radiation entering through the slit 12 for selectively dispersing the reflected radiation at different reflected angles depending upon the wavelengths of incident radiation. The reflection grating usually consists of a curved reflector surface provided with fine parallel V-shaped grooves. For selecting from the radiation reflected by the grating 13, radiation of substantially a single wavelength, there is provided an exit slit 14, through which radiation of substantially a single wavelength falls upon a condenser lens 15, provided for the purpose of converging the divergent incident beam of radiation into a parallel beam.

The reflection grating 13 is usually adjustably mounted, so that radiation of different wavelengths can be selected by the exit slit 14.

An optical system is provided for producing radiation independent of the concentration of a substance in the matter to be investigated and for producing radiation representative of the concentration of this substance in the matter. This system comprises a pair of mirrors 16 and 17, each arranged at an angle of 45 degrees with respect to the direction of the incident parallel radiation, to produce two beams 18 and 19 of equal intensity. Another pair of mirrors 20 and 21 are placed in the paths of the beams 18 and 19, respectively, to deflect the beams into two parallel beams 22 and 23.

In the path of beam 22 there is positioned a cell 24 containing the matter to be investigated. This matter may be, for example, a liquid solution containing the substance, the concentration of which it is desired to measure. Another cell 25, of identical material and length, is placed in the path of beam 23. This cell contains the liquid without the substance.

For alternately and periodically interrupting beams 22 and 23, there is provided a sector 26, a plan view of which is also shown in Fig. 1A, adapted to be driven at a substantially constant speed by means of a motor 27.

The radiation beams transmitted through cells 24 and 25 are deflected by a pair of mirrors 28 and 29, each arranged under 45 degrees with respect to the transmitted beams. The beams thus reflected become incident upon a pair of mirrors 30 and 31, respectively, arranged under such angles as to direct the beams 32 and 33 reflected therefrom, upon the same area of a radiation responsive surface.

For converting radiation into electrical current, there is provided an electronic vacuum tube, which is a combination photocell and electron multiplier. Such tubes are well known in the art, and comprise an evacuated envelope 34, having at least a portion 35 which is not opaque to the radiation to be converted. The envelope 34 contains a plurality of electrodes 36 to 42, serially arranged as shown, all of which are preferably provided with caesiated silver surfaces. Such surfaces are both photoemissive and secondary electron emissive. Electrode 36 is positioned opposite portion 35 of the envelope 34 and in a position to intercept radiation beams 32 and 33. Electrodes 36 to 40 and electrode 42 are held at increasingly positive potentials by means of potential sources 43 and 44, indicated for the sake of convenience as batteries, and a potential divider, generally indicated at 45.

For converting the electron current into a voltage proportional to the natural logarithm of the current, and hence also of the radiation intensity, there is provided an electron discharge tube 46 of the pentode type, preferably type 77, having an anode, three grids, a cathode, and a heater. The anode is connected to electrode 41; the cathode is connected to ground, while all three grids are held at the same potential, preferably about 45 volts positive with respect to ground, as indicated.

In order to obtain logarithmic operation of the tube 46, for which the cathode temperature must be lower than for normal amplifier operation, a variable rheostat 47 is placed in the filament circuit, as shown. The rheostat is preferably adjusted to such a value that the filament voltage is about 4.4 volts, while 6.3 volts are required for normal operation.

The tube 46 connected in circuit as shown and described, yields a logarithmic relation between its anode current and the voltage between anode and cathode, and is referred to in the art as a logarithmic amplifier. It was found that a type 77 tube yields a substantially faultless logarithmic relation.

For amplification of the voltage obtained between anode and cathode of tube 46, there is provided an amplifier tube 48, having an anode, a control grid, a cathode, and a heater. The control grid of tube 48 is connected to the anode of tube 46, and thereby also to electrode 41, as shown. The cathode is connected to ground by way of the parallel combination of a resistor 49 and a by-pass condenser 50, for obtaining operating bias voltage, as is conventional in the art. The anode of tube 48 is connected by way of a load resistor 51 to a source of operating potential, indicated as 250 volts positive with respect to ground.

For deriving the alternating component of the voltage drop produced across the load resistor 51 and for rectifying the same, there is provided a diode rectifier tube 52, having an anode, a cathode, and a filament. The rectifier tube 52 is coupled to the load resistor 51 by means of a coupling condenser 53 and a resistor 54, as shown. The cathode of rectifier 52 is connected to ground by way of the parallel combination of a diode load resistor 55 and a by-pass condenser 56. For indicating the rectified voltage developed across the diode load resistor 55, a voltage meter 57 or other indicator is connected in parallel relation thereto, between points A and B.

A voltage source 58 schematically indicated as a battery, is provided to supply operating voltage to the anode of tube 48; and a voltage source 59, also schematically indicated as a battery is provided to supply voltage to the filaments of tubes 46, 48, and 52, by connecting points XX in the conventional manner.

In operation, a portion of the emission radiated from the emitter 10 enters through the entrance slit 12 of the monochromator 11 and becomes incident upon the reflection grating 13. This grating reflects radiation of different wavelengths under different angles, and, due to its curvature causes reflected rays of radiation of the same wavelength to converge. The converging rays of substantially the same wavelength pass through the exit slit 14 and pass through the condenser lens 15 and are converted into parallel rays, which become incident upon the mirror surfaces 16 and 17, arranged to split the incident radiation into two beams 18 and 19, respectively, of equal intensity.

Beams 18 and 19 are converted into two parallel beams of radiation 22 and 23, by means of mirrors 20 and 21, respectively. Radiation beam 22 passes through the cell 24 containing the matter to be investigated. In case this matter is a liquid solution, the cell may be a receptacle composed of a material transparent to the incident radiation. The liquid in this cell contains the substance, the concentration of which it is desired to measure. Depending upon the wavelength of the radiation incident upon the cell, as well as depending upon the physical characteristics of the cell material, the solvent and the amount of concentration of the substance present in the solvent, and depending upon the length of travel of the radiation through the liquid and the cell walls, the intensity of the radiation transmitted through the cell is a greater or lesser fraction of the intensity of the incident radiation depending upon the degree of absorption of the radiation.

Since it is of interest only to obtain a quantity representative of the amount of the substance present in the liquid, radiation beam 23 is made to pass through the cell 25, structurally identical with cell 24 and of the same material, which contains the solvent alone, without any of the substance. The intensity of the radiation transmitted through cell 25 is again dependent upon all of the above mentioned factors, except the amount or concentration of the substance in the liquid, since none is present. Again the intensity of the transmitted radiation is a greater or lesser fraction of the intensity of the incident radiation.

Beams 22 and 23, after suffering a loss in intensity by transmission through the cells 24 and 25, respectively, are then alternately and periodically intercepted by the semicircular sector 26, which is driven by the motor 27, at a speed of, for example, several thousand revolutions per minute.

The sector is so designed, that a relatively short transition time is obtained, during which increasingly greater portions of one beam are intercepted, while simultaneously increasingly greater portions of the other beam are allowed to pass.

When not intercepted by the sector 26, beams 22 and 23 become incident upon mirrors 28 and 29, respectively, and are reflected upon mirrors 30 and 31, respectively. The latter mirrors are so arranged that the beams 32 and 33, reflected therefrom, become incident upon the same area of the photoemissive electrode 36 in the envelope 34, after passing through portion 35 thereof.

Upon exposure of the electrode 36 to one of the radiation beams 32 or 33, this electrode emits an electron current directly proportional to the intensity of the incident beam. Due to the configuration of the electrodes 37 to 42, and the successively more positive operating potentials applied thereto, an electron stream flows between successive ones of the electrodes as indicated by the broken line in Fig. 1. Upon impact with each of the electrodes 37 to 41, secondary electrons are liberated greater in number than the primary electrons impacting the particular electrode, so that a greatly augmented electron stream is finally collected by the electrode 42. In the case of electrodes 37 to 40, the difference in the number of primary electrons arriving at an electrode, and the number of secondary electrons leaving therefrom, is supplied directly by the potential source 43 by way of the potential divider 45.

However, in the case of electrode 41, the electron discharge tube 46 is connected in the path between the electrode and the potential source, so that any electron stream between electrode 41 and potential source 43 must flow through the tube 46. If the tube 46 is of the type 77, and operated substantially as in Fig. 1, the following relation holds true between the voltage developed between anode and cathode of tube 46 and the electron current from cathode to anode of the tube: $e = K \log_e i + $ constant, where $e$ is the voltage between anode and cathode, K is a constant, and $i$ is the electron current. Since the primary electron current emitted by the electrode 36 is directly proportional to the intensity of the radiation incident thereon, and the electron currents throughout the envelope 34, multiplied by secondary emission from the various electrodes are directly proportional to the primary electron current, it follows that the anode current in tube envelope 34 is also directly proportional to the radiation intensity.

Therefore, the following relation exists between the voltage $e$ between anode and cathode of the tube 46 and the radiation intensity I: $e = A \log_e I + C$, where A and C are constants.

Assume now, that I is the intensity of the radiation beam 32, consisting of the radiation transmitted through cell 24, while $I_o$ is the intensity of the radiation beam 33, consisting of the radiation transmitted through cell 25. Since the beams 32 and 33 are alternately and periodically incident upon photoemissive electrode 36, the voltage $e$ between anode and cathode of tube 46 alternately assumes the values $e_1 = A \log_e I_o + C$ and $e_2 = A \log_e I + C$, and has the nature of a unidirectional voltage of periodically fluctuating magnitude, as illustrated in Fig. 2. In other words the voltage $e$ has a steady unidirectional component, and an alternating component, and the particular significance of the latter will be shown below.

The voltage $e$ is applied between the control grid and the cathode of tube 48 and an amplified voltage $e^1$ directly proportional to voltage $e$ appears across the resistor 51. Since the resistor 54 is coupled to resistor 51 by way of the coupling condenser 53, which allows only the alternating component of the voltage $e^1$ to pass, the alternating voltage component alone appears across the resistor 54. This voltage component is illustrated in Fig. 4 and has a peak to peak magnitude $$e_3 = e_2' - e_1' = A' \log_e I + C - (A' \log_e I_o + C)$$
$$= A' (\log_e I - \log_e I_o) = A' \log_e \frac{I}{I_o}$$

since the difference between the logarithms of two numbers equals the logarithm of their ratio.

Hence by producing a voltage component proportional to the difference between two radiation intensities, a voltage component is produced of a magnitude which is proportional to the logarithm of the ratio of the radiation intensities, which is the desired quantity.

By means of the diode rectifier 52, and the parallel combination of the resistor 55 and the condenser 56, a unidirectional rectified D. C. voltage is developed across that combination between points A and B, which is directly proportional to the peak to peak value of the voltage across resistor 54, if the time constant of the combination is chosen sufficiently great.

The rectified voltage between points A and B is measured by means of a D. C. indicating meter. Obviously any indicating or recording instrument can be connected between points A and B.

Because of the relatively high speed of alternation between radiation beams incident upon the photoemissive electrode 36, the measured value of the logarithm of the ratio of radiation intensities is not influenced by fluctuations in the intensity of the radiation source, since these fluctuations are always considerably slower than the speed of alternation.

Measurements of concentration are sometimes made by the use of radiation of substantially a single wavelength, while at other times, and particularly for qualitative investigation of the presence of a substance or substances, the wavelength of the radiation incident upon cells 24 and 25 is varied. This variation is usually effected by rotation and displacement of the reflection grating 13, as is well known in the art. A D. C. voltage recorder connected to points A and B, can then be used for automatically tracing absorption curves.

It will be apparent from the above to those skilled in the art, that the present invention can also be practiced equally well in spectroscopic emission analysis. For this purpose, it is general practice to select a reference substance preesnt in known concentration in the matter under investigation or, if such a substance is not present, to add a reference substance in known concentration. This reference must be capable of producing radiation only of wavelengths different from the radiation of the substance of unknown concentration. When the matter is excited to radiate, by means of an electric arc or spark in the conventional manner, radiations from the reference substance and the substance of unknown concentration can be separated by means of a conventional spectrometer into two separate and distinct spectral lines. These radiations are then, in accordance with the present invention, alternately caused to fall upon the same area of the photoemissive electrode of a combination photocell and electron multiplier of the type previously described. Using the same logarithmic amplifier and rectifier apparatus disclosed above, a voltage is then produced which is proportional to the logarithm of the ratio of the two radiation intensities, and therefore, proportional to the previously unknown concentration of the substance in the matter under investigation.

Since the remaining apparatus in Fig. 1 functions in the same manner as for absorption analysis, a unidirectional voltage is produced between points A and B, which is representative of the logarithm of the ratio of the intensities of the two spectral lines, which is also the logarithm of the concentration, as initially pointed out.

Since the apparatus according to this invention is suitable for continuous sampling, the unidirectional voltage developed between points A and B, can be used for automatically controlling chemical processes. Control apparatus for this purpose is well known in the art.

While there has been described what is at present considered the preferred embodiment of the invention, it will be obvious to those skilled in the art that various changes and modifications may be made therein without departing from the invention.

What is claimed is:

1. Photometric apparatus comprising means for producing radiation of an intensity dependent upon a characteristic of a substance in matter under investigation, means for producing radiation of an intensity independent of said characteristic of said substance, said characteristic being proportional to the logarithm of the ratio of said first radiation intensity to said second radiation intensity, a single radiation responsive means adapted to be exposed to said first and said second radiation, means cooperating with said radiation responsive means for producing a voltage of a magnitude logarithmically proportional to the intensities of said radiations, means for deriving from said voltage a second voltage of a magnitude proportional to the logarithm of the ratio of said radiation intensities and thereby representative of said characteristic, and means for utilizing said second voltage.

2. Photometric apparatus comprising means for producing radiation of an intensity dependent upon a characteristic of a substance in matter under investigation, means for producing radiation of an intensity independent of said characteristic of said substance, said characteristic being proportional to the logarithm of the ratio of said first radiation intensity to said second radiation intensity, radiation responsive means adapted alternately to be exposed to said first and second radiation, means cooperating with said radiation responsive means for producing a voltage of a magnitude logarithmically proportional to the intensities of said radiations, means for deriving from said voltage a second voltage of a magnitude proportional to the logarithm of the ratio of said radiation intensities and thereby representative of said characteristic, and means for utilizing said second voltage.

3. Photometric apparatus comprising means for producing radiation of an intensity dependent upon a characteristic of a substance in matter under investigation, means for producing radiation of an intensity independent of said characteristic of said substance, said characteristic being proportional to the logarithm of the ratio of said first radiation intensity to said second radiation intensity, a single radiation responsive means adapted alternately to be exposed to said first and said second radiation, means cooperating with said radiation responsive means for producing a voltage of a magnitude logarithmically proportional to the intensities of said radiations, means for deriving from said voltage a second voltage of a magnitude proportional to the logarithm of the ratio of said radiation intensities and thereby representative of said characteristic, and means for utilizing said second voltage.

4. Photometric apparatus comprising means for producing radiation of an intensity dependent upon a characteristic of a substance in matter under investigation, means for producing radiation of an intensity independent of said characteristic of said substance, said characteristic being proportional to the logarithm of the ratio of said first radiation intensity to said second radiation intensity, radiation responsive means adapted alternately to be exposed to said first and said second radiation, means including an electron discharge tube cooperating with said radiation responsive means for producing a voltage of a magnitude logarithmically proportional to the intensities of said radiations, means for deriving from said voltage a second voltage of a magnitude proportional to the logarithm of the ratio of said radiation intensities and thereby representative of said characteristic, and means for utilizing said second voltage.

5. Photometric apparatus comprising means for producing radiation of an intensity dependent upon a characteristic of a substance in matter under investigation, means for producing radiation of an intensity independent of said characteristic of said substance, said characteristic being proportional to the logarithm of the ratio of said first radiation intensity to said second radiation intensity, radiation responsive means adapted alternately to be exposed to said first and said second radiation, means cooperating with said radiation responsive means for producing a voltage of a magnitude logarithmically proportional to the intensities of said radiations, means for deriving from said first voltage a second voltage indicative of differences only in the instantaneous magnitudes of said first voltage, means for deriving from said second voltage a third voltage indicative of the magnitude of said second voltage and, thereby, indicative of the logarithm of the intensities of said radiations and representative of said characteristic, and means for utilizing said third voltage.

6. Photometric apparatus comprising means for producing radiation of an intensity dependent upon a characteristic of a substance in matter under investigation, means for producing radiation of an intensity independent of said characteristic of said substance, said characteristic being proportional to the logarithm of the ratio of said first radiation intensity to said second radiation intensity, radiation responsive means adapted alternately to be exposed to said first and said second radiation, means including an electron discharge tube cooperating with said radiation responsive means for producing a voltage of a magnitude logarithmically proportional to the intensities of said radiations, means for deriving from said voltage an alternating voltage of a magnitude indicative of the logarithm of the ratio of said radiation intensities, means including rectifier means for deriving from said alternating voltage a unidirectional voltage indicative of the magnitude of said alternating voltage, said unidirectional voltage being representative of said characteristic, and means for utilizing said unidirectional voltage.

7. Photometric means comprising, means for producing radiation of an intensity independent of a characteristic of a substance, means for producing radiation of an intensity dependent upon a characteristic of said substance, radiation responsive means adapted alternately to be exposed to said first and said second radiation, said characteristic being proportional to the logarithm of the ratio of said first radiation intensity to said second radiation intensity, means including an electron discharge tube cooperating with said radiation responsive means for producing a unidirectional voltage of an instantaneous magnitude logarithmically proportional to the intensities of said radiations, means for deriving from said unidirectional voltage an alternating voltage corresponding to fluctuations in the magnitude of said unidirectional voltage, means including rectifier means for deriving from said alternating voltage a second unidirectional voltage indicative of the magnitude of said alternating voltage and, thereby, indicative of the logarithm of the ratio of said intensities of said radiations, said second unidirectional voltage being representative of said characteristic, and means for utilizing said second unidirectional voltage.

8. Photometric means comprising means for producing radiation of an intensity independent of a characteristic of a substance, means for producing radiation of an intensity dependent upon a characteristic of said substance, said characteristic being proportional to the logarithm of the ratio of said first radiation intensity to said second radiation intensity, radiation responsive means adapted alternately and periodically to be exposed to said first and said second radiation during time intervals of substantially equal duration, means including an electron discharge tube cooperating with said radiation responsive means for producing a unidirectional voltage of an instantaneous magnitude logarithmically proportional to radiation intensity, means for deriving from said unidirectional voltage an alternating voltage corresponding to periodic fluctuations in the magnitude of said unidirectional voltage, means for rectifying said alternating voltage to produce a second unidirectional voltage proportional to the logarithm of the ratio of the intensities of said radiations, said second unidirectional voltage being representative of said characteristic, and means for utilizing said second unidirectional voltage.

ROBERT VANCE MEYER.

REFERENCES CITED

The following references are of record in the file of this patent:

UNITED STATES PATENTS

| Number | Name | Date |
|---|---|---|
| 1,746,525 | Darrah | Feb. 11, 1930 |
| 1,806,199 | Hardy et al. | May 19, 1931 |
| 1,816,047 | Keuffel | July 28, 1931 |
| 1,919,182 | Fitzgerald | July 18, 1933 |
| 1,999,023 | Sharp et al. | Apr. 23, 1935 |
| 2,251,613 | Kott | Aug. 5, 1941 |
| 2,383,075 | Pineo | Aug. 21, 1945 |
| 2,417,023 | Sweet | Mar. 4, 1947 |